H. HOLUB.
BEET HARVESTING MACHINE.
APPLICATION FILED MAY 3, 1915.
1,166,762.
Patented Jan. 4, 1916.
4 SHEETS—SHEET 4.
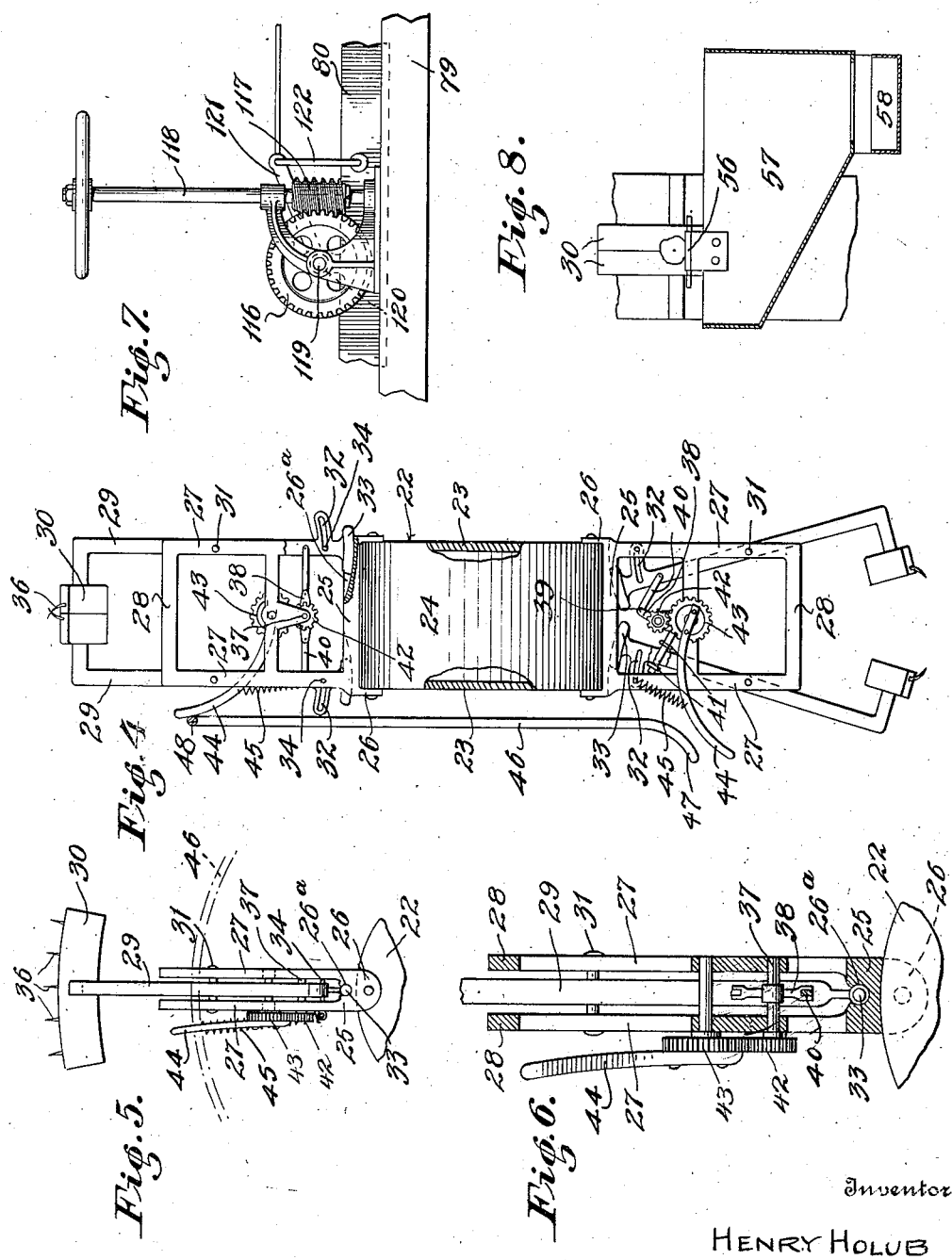
Inventor
HENRY HOLUB
By Watson E. Coleman
Attorney

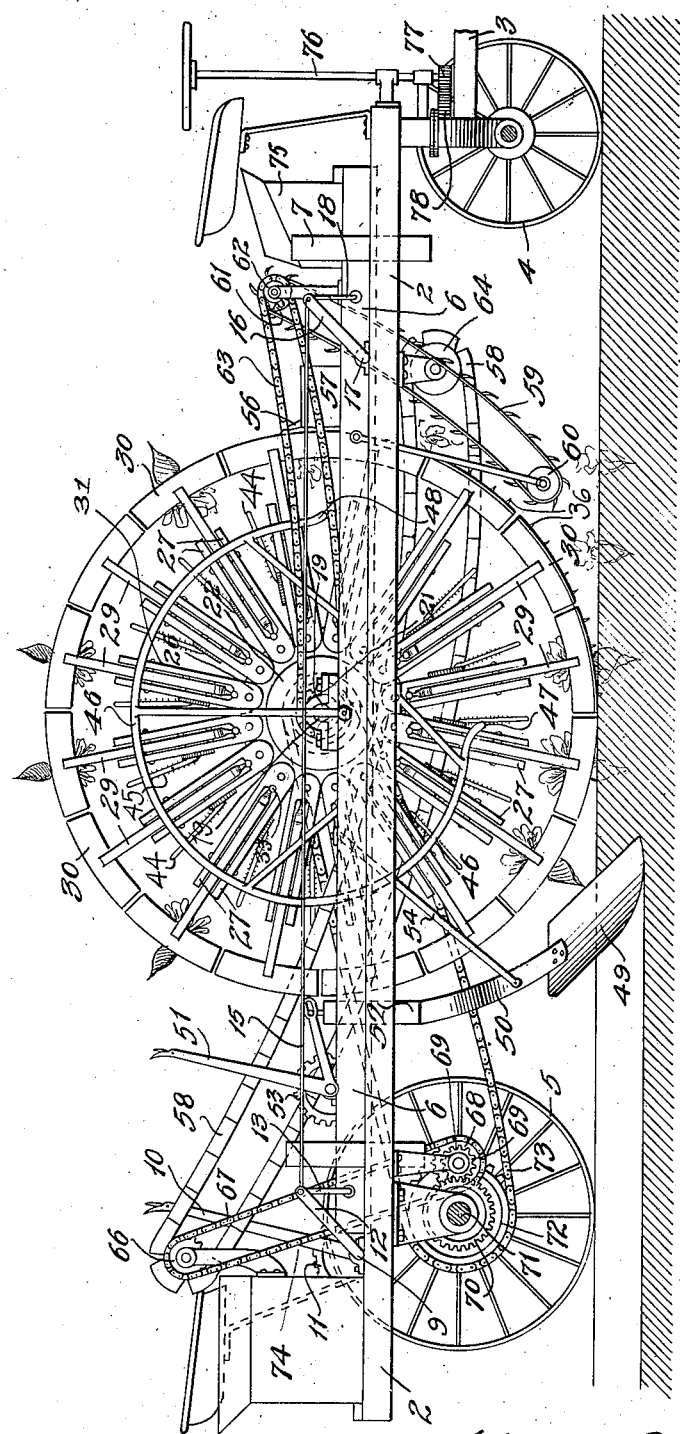

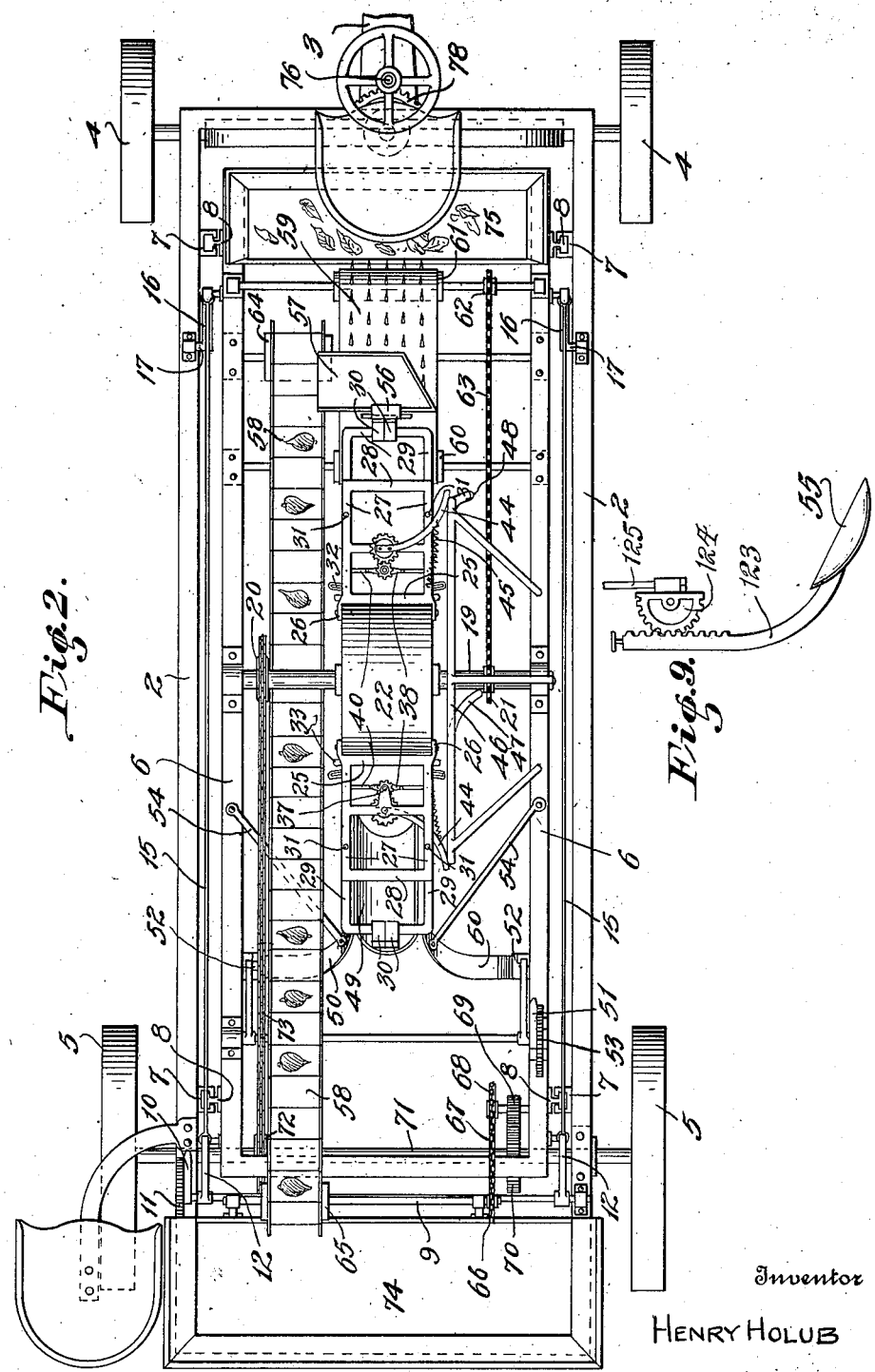

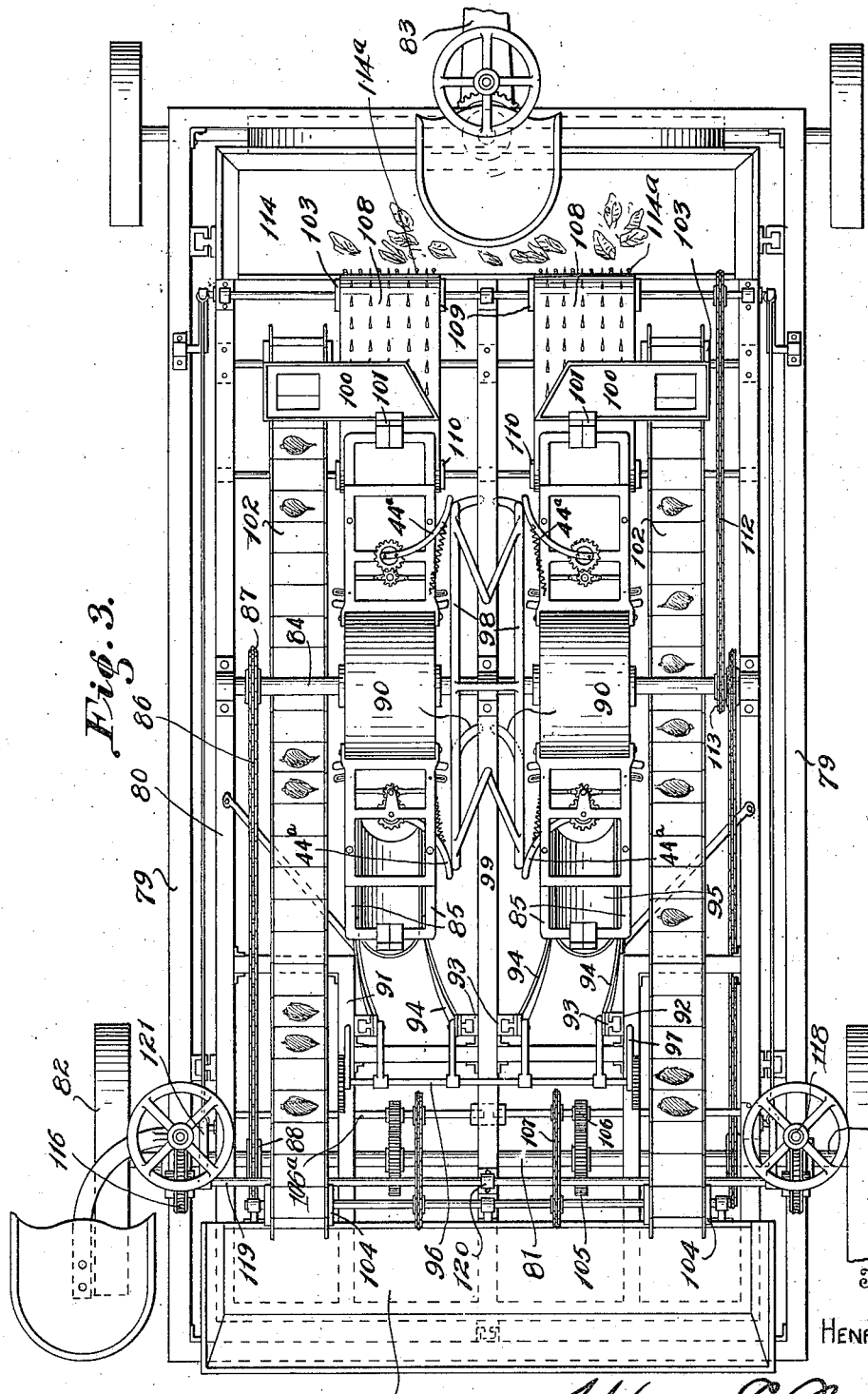

UNITED STATES PATENT OFFICE.

HENRY HOLUB, OF LOUISE, TEXAS, ASSIGNOR OF ONE-THIRD TO IGNATZ H. VYVIAL, OF LOUISE, TEXAS.

BEET-HARVESTING MACHINE.

1,166,762.      Specification of Letters Patent.      Patented Jan. 4, 1916.

Application filed May 3, 1915. Serial No. 25,545.

*To all whom it may concern:*

Be it known that I, HENRY HOLUB, a citizen of the United States, residing at Louise, in the county of Wharton and State of Texas, have invented certain new and useful Improvements in Beet-Harvesting Machines, of which the following is a specification, reference being had to the accompanying drawings.

My invention relates to agricultural machinery, and particularly to machines for harvesting turnips, carrots, beets and other vegetables having tops protruding above the ground.

The primary object of my invention is the provision of a machine of this character having means for grasping the top of the vegetable, and also means for loosening the earth about the body of the vegetable and raising the body from the earth, and a further object in this connection is to provide means for cutting off the body of the vegetable from the top.

Still another object of my invention is to provide, in connection with the means for raising the vegetable from the earth and cutting off the body from the top, means for conveying the top and body to two different portions of or receptacles on the machine.

Still another object of my invention is to provide a mechanism which is capable of use either for pulling and topping two rows of vegetables or one row at a time.

Still another object of my invention is the provision, in a machine of this character, of a plurality of pairs of jaws movable in a closed path, each pair of jaws being positively closed at the proper moment in order to grasp a protruding top of the vegetable, and a plow or earth loosener used in connection with the jaws and acting to loosen the earth so that the jaws in their upward movement may carry the vegetable from the ground.

Still another object of this invention is the provision on the gripping jaws of laterally and outwardly curved prongs or teeth, which, as the jaws close toward the beet top, will lift the leaves of the beet top so that they may be readily engaged and firmly held by the jaws themselves.

A further object of my invention is to provide, in connection with the movable jaws, a knife arranged in the path of the vegetable which will sever the body of the vegetable from the tops, which are gripped by the jaws, the body being discharged into a suitable carrier and the top being also discharged into another carrier.

Still another object of my invention is to improve generally upon the details of construction in machines of this character, simplify them, and render them more positive in their action.

My invention is illustrated in the accompanying drawings, wherein:

Figure 1 is a side elevation of a beet harvesting machine constructed in accordance with my invention; Fig. 2 is a top plan view of the machine shown in Fig. 1, a number of arms 27 with their corresponding jaws being removed to avoid confusion; Fig. 3 is a top plan view of a double machine, the upwardly projecting arms and jaw carrying members being removed in order to avoid confusion; Fig. 4 is a detail elevation of two pairs of beet pulling jaws and the operating mechanism therefor; Fig. 5 is an end view of one of the pairs of jaws; Fig. 6 is a vertical sectional transverse view of the jaw supporting frame and actuating mechanism for the jaws; Fig. 7 is a detail elevation of the means shown in Fig. 3 for adjusting the inner frame; Fig. 8 is a fragmentary section through one of the chutes directing the beet bodies onto the carrier 58; Fig. 9 is an elevation showing a different manner of adjusting the plows and a different form of plow.

Broadly speaking, my machine comprises a wheeled supporting body and a rotatable element mounted upon the body and made up of a plurality of radially disposed pairs of jaws, each pair of jaws being automatically closed as it reaches a certain point and thereby gripping the top of a vegetable, the jaws moving from that point upward, rearward, and forward in a circle, there being a plow or like earth loosening member disposed behind the point where the jaws are closed which acts to loosen the earth around the vegetables and permit their elevation by the jaws.

Disposed adjacent the path of movement of the jaws and at a point just before the jaws commence to move downward and rearward again, there is a knife against which the body of the vegetable is brought whereby the body is severed from the top which is grasped by the jaws. The body falls into a carrier whereby it is carried into a suitable receptacle. After the cutting operation has been completed, the jaws open to permit the tops grasped thereby to fall into another carrier. Means are also provided for raising the rotatable element carrying the jaws so as to increase or decrease its distance from the ground, and means are also provided for independently raising or lowering the ground engaging element or plow.

In Figs. 1 and 2, I show a single row machine, and as that is the simplest form of my invention I will describe it first. In these figures, 2 designates, generally speaking, an outer frame approximately rectangular in form and to which a draft tongue 3 is operatively connected, as will be later described. This frame 2 is supported by means of the usual forward traction wheels 4 and the rear traction wheels 5.

Mounted upon the frame 2 for vertical adjustment in a manner which will be later stated, is a supporting frame 6, likewise approximately rectangular in form. Preferably the side bars of the frame 2 are provided with the upwardly extending guides 7 and the side bars of the inner frame 6, or vertically adjustable frame, are likewise provided with guides 8 illustrated, as T-shaped in cross section, which have sliding engagement with the guides 7. The guides 7 may also be provided on the rear end bars of the frames 2 and 6.

Mounted upon the frame 2 and extending transversely across it adjacent its rear end is a shaft 9, carrying a lever 10, this lever operating over a sector 11. This shaft 9, adjacent the side bar of the frame 6, is provided with the upwardly extending arms 12, which arms are connected by means of links 13 to the side bars of the frame 6. It will be obvious now that a rotation of the shaft 9 under the action of the lever 10 will cause the lifting of the frame 6 relative to the frame 2. The shaft 9 also has outwardly projecting arms, which may be the arms 12, which are operatively connected by means of links or rods 15 to crank arms 16 mounted upon stub shafts 17, these crank arms being connected by means of links 18 to the forward portion of the frame 6. Thus the frame 6 may be readily adjusted vertically with reference to the frame 2.

Mounted upon the frame 6 at about its middle and extending transversely across the frame, is a shaft 19, this shaft being provided at its opposite ends with sprocket wheels 20 and 21 whereby the carriers, later described, will be driven. Mounted upon the shaft 19 and rotatable therewith is a rotatable drum-like member 22, which, as illustrated in Fig. 4, is formed with the two end walls 23 and the transverse peripheral wall 24. Mounted at spaced distances upon the periphery of the drum 22 are a plurality of radially directed jaw supporting members. Each jaw supporting member comprises a base 25 extending across the periphery of the drum 22 and having downwardly bent ears 26 whereby it is firmly attached to the drum. This base 25 is longitudinally slotted, as at 26ª, upon its upper face adjacent its opposite ends.

Extending outward at each end of the base are the pairs of arms 27 each connected by a cross bar 28 and pivoted between each pair of arms is the shank 29 of a clamping jaw 30. This shank is pivoted upon a pivot pin 31 extending through the two arms, and the lower end of the shank is enlarged and formed with a slot 32. Below this enlargement there is a neck terminating in an arcuate head 33, which head is adapted to fit within the slot or recess 26ª. A pin 34 passes through the slot 32 and is connected to the members 27, this pin acting as a limiting stop to limit the oscillation of the levers or shanks 29 of the jaws. Each shank 29 at its outer end is angularly bent and carries upon it a jaw 30, this jaw having either a smooth or corrugated active face and being formed with the outwardly projecting teeth or prongs 36. It will be noted, of course, that there are two of these shank members 29 with complemental confronting jaws 30, and that when the inner ends of the shanks are forced apart the jaws will be brought together, and when the inner ends are drawn together the jaws will be forced apart. The jaws are arcuate in elevation, as clearly shown in Fig. 5, and the jaws have such length that they are separated from each other by a relatively slight distance so that the jaws form an almost continuous annulus carried by the shaft 9, as shown clearly in Fig. 1.

It will be seen from Fig. 1 that it is necessary that each pair of jaws shall close as it reaches approximately its lowest point and shall remain closed during a portion of its travel, and that at a certain predetermined point the jaws shall open and remain open until they again reach the lowest point in their travel. For the purpose of automatically opening and closing the jaws I operatively support upon the frame formed by the members 27 and 28 the shaft 37. This shaft carries upon one end a bar 38 having diametrically disposed projecting pins 39 to which are connected the links 40. These links 40 are each pivoted to a corresponding lever or shank 29, the stops 41 of this link being located on opposite sides of the lever. It will now be seen that upon a rotation of the shaft 37 in one direction the movement of the links will cause the levers 29 to be drawn toward each other, thus bringing the jaws 30 into action, and that upon a reverse movement of the shaft 37 the jaws will be forced apart. For the purpose of rotating the shaft 37, I mount upon this shaft the pinion 42 which has engagement with a toothed gear wheel 43, supported in any suitable manner, this gear wheel having projecting from it an arm 44. This arm is drawn inward by means of a spring 45, this spring acting to urge the gear wheel 43 into such position that the jaws will be held open, but yielding to permit, upon an actuation of the arm 44, the jaws to be closed. For the purpose of engaging the arm 44 to close the jaws, I provide a cam 46, this cam being circular in form and the entrance end of the cam beginning at a point a little rearward of a vertical plane cutting through the axis of the shaft 9, the other or exit end of the cam terminating at a point just below the level of the frame 6. Both ends of the cam are deflected, and the several arms 44 engage with this cam from the entrance end 47 thereof to the exit end 48 thereof.

As before remarked, the entrance end of the cam is deflected, and as a consequence causes a sudden lateral movement of the arm 44 of each pair of jaws, and therefore causes the sudden closing of the jaws just as the jaws are about to move upward and rearward in their path of travel. When the pair of jaws reaches the exit end of the cam, however, the spring 45 will cause a reverse movement of the arm 44 and of the gear wheel 43 and cause the opening of the jaws, the amount to which the jaws are opened being regulated by the length of the slots 32, the jaws being held from lateral movement by the engagement of the lower terminal end 33 with the slot 26 formed in the base or member 25.

For the purpose of loosening the soil, plowing up and assisting in lifting the vegetables, the tops of which have been engaged by the several jaws, I provide any suitable plow share or shovel, designated 49, which is disposed beneath the lowest point of the jaws and slightly rearward of a vertical plane cutting the shaft 19. I do not wish to be limited to the particular form of plow or shovel or other implement used for the purpose of plowing up the ground and assisting in raising the vegetables, but in Fig. 2 I have illustrated an ordinary shovel plow mounted upon divergent arms 50, the arms extending upward and laterally outward and being slidingly supported at their rear ends and on their outer ends on the side bars of the frame 6.

Mounted upon the frame 6 is a lever 51 operatively connected to the T-shaped terminal ends 52 of the supporting bars 50 and operating in conjunction with a sector 53. The terminal ends 52 engage in vertical guides carried by the side bars of the frame 6. The supporting bars 50 of the plow are also connected by forwardly and upwardly extended pivotal braces 54 to the side bars of the frame 6. It will thus be seen that the plow may be raised or lowered to any height required. As before remarked, I do not wish to be limited to the exact form of these plows, and may use the form of plow used in Fig. 9, this plow having the form of a disk and being designated 55.

The disk 55 is mounted upon an upwardly extending arm 123 formed at its upper end with ratchet teeth which engage with a sector gear 124 supported in any suitable manner and operatively connected to an actuating rod 125. Preferably the plows are transversely U-shaped so as to not only plow up the earth around and beneath the vegetable being raised, but likewise scoop the vegetable up so as to assist in raising it through the soil.

As will be noted in Fig. 1, the jaws close upon the beet, turnip, or other vegetable, at the point where the top sprouts from the body of the vegetable. The plow or shovel assists the jaws in raising the vegetable from the ground and the vegetable is carried upward with the jaws, then forward and then downward. For the purpose of separating the body of the vegetable from the top, I provide a knife 56, this knife being slightly curved and formed in the forward wall of an inclined chute 57 which delivers the severed body of the vegetable to a carrier 58 whereby it is transferred to any suitable receptacle on the machine. The jaws still remain closed after the body is severed from the top, but as soon as the jaws have passed the exit end 48 of the cam 46 the jaws will open, dropping the leaves from the top of the vegetable onto a carrier 59. This carrier has the form of an apron or endless band, and passes around a roller 60 which is suitably supported from the frame of the machine, and from the roller 60 the carrier passes upward and forward and over a roller 61 which carries a sprocket wheel 62 over which passes a sprocket chain 63, this sprocket chain passing over the sprocket wheel 21 mounted upon the shaft 19. Thus the carrier 59 is driven by the power of the machine. The carrier 58 is mounted at one end upon the roller 64 and at its rear end passes over a roller 65 operatively supported upon the frame of the machine. This roller 65 carries upon its shaft the sprocket wheel 66 over which passes a sprocket chain 67 passing to a sprocket wheel 68 mounted upon a stub shaft carrying a gear wheel 69 which meshes with a gear wheel 70 mounted upon the axle 71 carrying the traction wheels 5. Also mounted upon this axle 71 is a sprocket wheel 72 which engages a sprocket chain 73 which passes forward and over the sprocket wheel 20 mounted upon the shaft 19. By this means the revolving jaw carrying element is actuated. The carrier 58 discharges the severed beets or other vegetables into the receptacle 74, while the carrier 59 discharges the tops which have been severed from the body into the receptacle 75. It will be obvious that the positions of these receptacles may be changed without changing the principle of operation of the machine. While I do not wish to limit myself to this, preferably, with a machine of the character described, the guiding or steering wheels 4 are required to be actuated by steering mechanism, and to this end I provide the vertical shaft 76 carrying at its lower end the gear wheel 77 which meshes with a sector 78 carried by the lower axle, and thus by rotating the shaft 76 the steering wheels may be shifted to steer the vehicle.

The operation of my invention will be obvious from the description before given. As the machine moves over the ground, the beet tops are grasped by the jaws and the beets are drawn out of the ground and carried around until the body of the beet is severed from the top. The jaws then release the beet top carried thereby and the top and body are carried to the several receptacles therefor. By raising or lowering the frame 6 by the mechanism heretofore described, the vertical elevation of the rotatable element formed by the jaws may be adjusted so that the jaws will grasp the vegetable at the junction of the top with the body. It is also possible, by actuating the lever 51, to raise or lower the plow so as to secure the best results.

In Figs. 3 and 7 I have shown another form of my invention which is practically the same as that heretofore described except that two sets of rotatable jaws are provided, two cutting devices, two chutes, two conveyers for carrying the beet bodies to the beet receptacle, and two conveyers for carrying the tops or leaves to the top receptacles, the framework being changed to accommodate this double construction.

Referring to Fig. 3, 79 designates the outer frame which is the same as the frame 2 previously described, and 80 designates the inner frame. The inner frame is guided upon the outer frame by means of the vertical guides, as previously stated, and is raised and lowered by a mechanism which will be later stated. The outer frame is supported at its rear end upon an axle 81 having the rear traction wheels 82, which axle forms the means whereby the rotating parts of the mechanism are driven. The outer frame is also provided with a tongue 83 and the steering mechanism previously described. Mounted within the inner frame 80 is the transverse shaft 84 carrying pairs of jaw supporting members 85 which are precisely the same as those previously described, the only difference being that there are two sets of these jaw supporting members.

The shaft 84 is driven by means of sprocket chains 86 which pass over sprocket wheels 87 carried at opposite ends of the shaft 84, and also over sprocket wheels 88 mounted upon the shaft 81. The levers 85 which carry the jaws 89 are mounted upon the spaced drums 90 in precisely the manner heretofore described and illustrated in Fig. 4, and these jaws are drawn toward each other or forced apart by means of the mechanism illustrated in Fig. 4 and previously described. Inasmuch as this mechanism was fully described in detail for the form of machine illustrated in Fig. 1, it will not be necessary to redescribe this portion of the apparatus.

Mounted upon the frame 80 are the braces 91 which extend inward from the frame 80 and carry upon them the vertical guides 92 in which the guide terminals 93 of the plow supporting bars 94 are supported. These plow supporting bars 94 carry the shovel or other plow 95, such as previously described, and these plows are raised or lowered by means of a transverse shaft 96 having its ends operatively engaged with the several supporting bars 94, this shaft 96 being rotated by means of a lever or levers 97 operating in conjunction with sector gears. I do not wish to limit myself to this particular manner of raising or lowering the plows or earth looseners as it is obvious that other means might be used for this purpose.

The jaws are closed by means of the oppositely disposed cams 98, each mounted upon a longitudinally extending frame bar 99. These cams are precisely the same as the cam 46, previously described, and have their exit ends inclined with relation to the path of travel of the actuating arms 44ª of the jaws.

Disposed in front of each pair of jaws is a laterally inclined chute 100 and a knife 101, the knife being upwardly curved. These chutes 100 are inclined in opposite directions and deliver the severed bodies of the beets or other vegetables upon the carriers 102. These carriers, like the carriers 58, are preferably slatted so as to prevent the beets or other vegetables from rolling off the carriers. Each of the carriers 102 is mounted upon a roller 103 at the forward end of the machine, and also upon a roller 104 mounted at the rear of the machine. The roller 104 is connected to the driving axle 81 by means of a gear wheel 105 meshing with a gear wheel 106 carried upon a shaft 106ª and power is transmitted from this shaft to the shaft of the roller 104 by means of a sprocket chain 107.

Disposed below the chutes 100 are the top carriers 108, these carriers being in the form of bands or belts provided with slats or preferably with teeth. There are two of these carriers, as previously stated, each mounted upon a roller 109, the lower ends of the carriers being mounted upon rollers 110. The rollers 109 are driven each by means of a sprocket chain 112 passing over a sprocket wheel 113 mounted upon the shaft 84. Each of the carriers 108 delivers into a top receiving body 114 which is provided with comb teeth 114ª, on its forward wall coacting with the teeth upon the carriers and scraping the tops from these carriers. Each of the carriers 102 discharges into a beet receiving receptacle 115 located at the rear of the machine, as heretofore described, or into any other suitable receptacle.

Because of the fact that the double machine requires considerable power to vertically adjust it and hold it in its adjusted position, I have provided, with the double machine, means somewhat different in operation for raising and lowering the inner frame and its supporting parts than that shown in Figs. 1 and 2. Thus in Figs. 3 and 7, the elevating means comprise a vertically disposed worm wheel 116 on each side of the machine, each engaged by a worm 117 on a vertically disposed shaft 118. The shafts 118 are supported upon the frame in any suitable manner, as is the wheel 116. The wheel 116 is mounted upon a shaft 119 supported in suitable bearings 120, and each of the shafts 119 carries inwardly extending radially directed arms 121, which, at their extremities, are connected by links 122 to the inner frame. It will thus be seen that by rotating the shaft 118 the inner frame may be raised or lowered, and that because of the use of a worm and worm wheel the inner frame may be held in its vertically adjusted position.

Of course it is obvious that many means might be provided for the vertical adjustment of the inner frame and its supported parts and for the separate adjustment of the several elements of the machine. Inasmuch as the manner of making these adjustments would be obvious to any mechanic familiar with agricultural machinery, I have illustrated only two forms of such adjustment and have not illustrated in detail means whereby separate and independent adjustments of the several parts may be secured.

While I have illustrated certain details of construction whereby the several operations desired may be secured, I wish it understood that I do not intend to limit myself to these details as it is obvious that many changes might be made in the arrangement of parts and in the form of the several parts without departing from the spirit of the invention.

Having described my invention, what I claim is:

1. In a beet harvester, the combination with a wheeled frame, of a rotatable extractor adapted to successively clamp, draw and release the beets and including a circular series of pairs of beet top engaging jaws, the jaws of each pair having outwardly and medially extending prongs adapted to raise the fallen leaves of the beet top into position to be engaged by the jaws.

2. The combination with a wheeled frame, of a rotatable beet extractor adapted to successively clamp, draw and release the beets, and a ground engaging member having the form of a shovel plow disposed below and rearward of the lowest point of travel of the extractor and in alinement with the extractor whereby the ground beneath the beets may be loosened and the beets raised as they are lifted.

3. A beet harvester including a rotatable element having a plurality of pairs of jaws movable in a closed path, means for closing and opening the jaws at separated points in the path of movement, and a ground engaging member operating in conjunction with said jaws disposed below and rearward of the lowest point of travel of said jaws and in alinement therewith whereby to loosen the ground beneath the beet and raise the beet at the time that the beet is engaged and lifted by the jaws.

4. A harvesting machine including a rotatable element having a plurality of independent disconnected pairs of jaws, means for closing and opening the jaws at separate points in their path of movement, and a knife disposed adjacent to the path of movement of the jaws.

5. In a beet harvester, the combination with a wheeled frame, of a rotatable extractor adapted to successively clamp, draw and release the beets and including a drum, a plurality of pairs of oppositely disposed radially directed arms operatively supported on the drum for pivotal movement in a plane transverse to the plane of rotation of the drum and carrying beet gripping jaws, a shiftable actuating member operatively mounted upon the drum in conjunction with each pair of jaws and operatively engaged with the arms thereof to cause an oscillation of the arms into or out of a gripping position, and a cam operatively mounted upon the frame and disposed in a plane parallel to the plane of rotation of the drum and engaging said actuating members.

6. In a beet harvester, the combination with a wheeled frame, of a rotatable beet extractor adapted to successively clamp, draw and release the beets and including a drum, a plurality of radially disposed frames mounted upon the drum, a pair of oppositely disposed radially extending arms pivotally supported on each frame for movement in a plane transverse to the plane of rotation of the drum and frame, said arms carrying coacting beet gripping jaws, a shiftable actuating member operatively mounted on each of said frames and operatively engaged with the arms to cause an oscillation of the arms into or out of a gripping position, and a cam disposed parallel to the path of movement of the drum and operatively engaging said members.

7. The combination with a wheeled frame, of a rotatable beet extractor adapted to successively clamp, draw and release the beets and including a drum, a plurality of radially extending frames mounted upon the drum, a pair of oppositely disposed radial arms pivotally mounted upon each of said frames for movement in a plane transverse to the plane of rotation of the drum and the frames, said arms carrying beet gripping jaws, a shiftable actuating member mounted upon each frame, a gear wheel connected to said member to rotate therewith, a pinion with which said gear wheel engages, operative connections between the pinion and the arms, a spring urging said member into a projected position, and a cam disposed parallel to the path of movement of the drum and engaging with all of said actuating members to shift them into a position to close the jaws.

8. In a beet harvester, the combination with a wheeled frame, of a rotatable extractor adapted to successively clamp, draw and release the beets including a drum, a plurality of radially disposed frames mounted on the drum, a pair of oppositely disposed radially extending arms pivotally mounted upon each frame for movement in a plane transverse to the plane of rotation of the drum, said arms carrying beet gripping jaws, the arms being extended below the pivotal axis thereof, means engaging the inner ends of said arms to thereby steady the arms, an actuating member operatively mounted upon each frame, an operative connection between the actuating member and said arms, a spring urging said actuating member into a position to open the jaws on the arms, and a cam disposed parallel to the path of movement of the drum and adapted to engage the actuating members to cause the closing of said arms.

9. The combination with a wheeled frame, of a beet extractor adapted to successively draw and release the beets and including a drum, a plurality of pairs of radially disposed frames, the frames of each pair being mounted in spaced relation to each other, a pair of arms pivotally supported upon and disposed between each pair of frames, a gear wheel rotatably mounted upon each pair of frames and having an outwardly extending actuating arm carried thereby, a pinion also operatively supported upon each pair of frames and engaging the gear wheel, links connecting the pinion to the corresponding jaw supporting arms, a spring urging the actuating arm into a normal position and thereby urging the arms to a position where the jaws should be operated, and a cam disposed parallel to the path of movement of the drum and adapted to engage said actuating arms to cause the closing of the jaws.

10. A harvesting machine of the character described comprising a rotatable member having a plurality of radially disposed pairs of jaw carrying levers each pivotally mounted at its lower end, jaws carried at the outer end of the levers, a rock shaft for each pair of said members having links connected each to one of said members, and means for rotating said shaft including an outwardly projecting arm, and a fixed cam disposed concentric to the common center of the said supporting members and engaging with the several arms to cause the closing of said levers at a predetermined point in the movement of the member and the releasing of said levers at another predetermined point.

11. In a machine of the character described, an outer frame, a supporting frame, means on the outer frame for raising or lowering the supporting frame, a shovel plow mounted upon the inner frame for vertical adjustment, a rotatable element mounted upon the inner frame forward of and in line with the plow and comprising a plurality of pairs of radially projecting jaw supporting members, jaws carried thereby, means for causing each pair of jaw supporting members to close toward each other at the beginning of the upward and rearward movement of said members, said means permitting the opening of the jaw supporting members at another predetermined point in the path of movement, a knife supported adjacent the path of movement of the said jaws and acting prior to the opening of the jaws, means coacting with the knife for discharging the portions of the vegetables cut by the knife into one portion of the machine, and means disposed below the jaws and adapted to receive the portion of the vegetable released by the jaws, said means acting to distribute said portion to another part of the machine.

12. In a machine of the character described, a wheeled supporting frame, a frame adjustably supported by the first-named frame, a shovel plow supported by said second-named frame, a rotatable beet pulling element rotatably mounted upon the second-named frame and comprising a plurality of pairs of jaws, said element being disposed in advance of and above the shovel plow and in alinement therewith, means for automatically closing each pair of jaws upon the upward and rearward movement thereof and at a point slightly in advance of the forward edge of the plow and opening each pair of jaws as they move downward and rearward, a knife disposed adjacent the path of movement of the jaws but above the point where the jaws open, a chute coacting with the knife, a carrier into which the chute discharges, a carrier disposed below the point where the jaws open, receptacles into which said carriers discharge, and means operated by the traction wheels of the machine for rotating said element and operating said carriers.

In testimony whereof I hereunto affix my signature in the presence of two witnesses.

HENRY HOLUB.

Witnesses:
J. H. CHROMCOK,
I. H. VYVIAL.